US011144979B1

(12) United States Patent
Sharshevsky et al.

(10) Patent No.: US 11,144,979 B1
(45) Date of Patent: Oct. 12, 2021

(54) METHOD, MEDIUM, AND SYSTEM FOR AUTOMATIC DATA EXTRACTION FROM WEB PAGES AND ANALYSIS THEREOF

(71) Applicant: PayPal, Inc., San Jose, CA (US)

(72) Inventors: Olga Sharshevsky, Holon (IL); Yael Cohen, Tel Aviv (IL); Elina Nemtsov, Kfar Saba (IL)

(73) Assignee: PAYPAL, INC., San Jose, CA (US)

(*) Notice: Subject to any disclaimer, the term of this patent is extended or adjusted under 35 U.S.C. 154(b) by 0 days.

(21) Appl. No.: 16/837,752

(22) Filed: Apr. 1, 2020

(51) Int. Cl.
*G06Q 30/00* (2012.01)
*G06Q 30/06* (2012.01)
*G06N 3/04* (2006.01)
*G06N 3/08* (2006.01)

(52) U.S. Cl.
CPC ........... *G06Q 30/0627* (2013.01); *G06N 3/04* (2013.01); *G06N 3/08* (2013.01); *G06Q 30/0605* (2013.01)

(58) Field of Classification Search
CPC .. G06Q 30/0627; G06Q 30/0605; G06N 3/04; G06N 3/08
See application file for complete search history.

(56) References Cited

U.S. PATENT DOCUMENTS

| 8,090,678 | B1* | 1/2012 | Glickman | G06F 16/35 707/602 |
| 2006/0129463 | A1* | 6/2006 | Zicherman | G06Q 30/0277 705/14.73 |
| 2007/0073580 | A1* | 3/2007 | Perry | G06Q 30/0255 705/14.53 |
| 2008/0115057 | A1* | 5/2008 | Grandhi | G06F 40/103 715/272 |
| 2017/0345075 | A1* | 11/2017 | Khandelwal | G06Q 30/0623 |
| 2017/0372408 | A1* | 12/2017 | Khandelwal | G06Q 30/0641 |
| 2018/0137560 | A1* | 5/2018 | Chopra | G06Q 30/0643 |
| 2019/0197063 | A1* | 6/2019 | Sekar | G06N 3/006 |

OTHER PUBLICATIONS https://www.zyte.com/blog/how-to-build-your-own-price-monitoring-tool/ (Year: 2016).*

* cited by examiner

*Primary Examiner* — Matthew E Zimmerman
(74) *Attorney, Agent, or Firm* — Haynes and Boone, LLP

(57) ABSTRACT

The present disclosure provides a method of automatically extracting data from web pages and analyzing the extracted data to generate an output. A plurality of web pages of a plurality of merchants is accessed. Based on the accessing of the web pages, a subset of the plurality of web pages is identified as inventory pages that contain information about products or services offered for sale. The inventory pages are electronically scanned to extract a price for each of the products or services. An output is generated that includes a listing of the products or services and prices associated with the products or services, respectively.

20 Claims, 7 Drawing Sheets

«METHOD, MEDIUM, AND SYSTEM FOR AUTOMATIC DATA EXTRACTION FROM WEB PAGES AND ANALYSIS THEREOF

BACKGROUND

Field of the Invention

The present application generally relates to automatic data extraction from web pages. More particularly, the present application involves using computer scripts and/or machine learning to analyze web pages of a plurality of online entities to extract product data.

Related Art

Rapid advances have been made in the past several decades in the fields of computer technology and telecommunications. As a result, these advances allow more and more transactions to be conducted online. For example, buyers and sellers may engage in electronic transactions with one another using various online marketplaces. It may be desirable to have knowledge (e.g., price) about the products/services being offered for sale, since such knowledge will offer insight with respect to the trends in different types of industries, product types, or geographical regions. Unfortunately, although the product/service information may be readily available on the merchants' websites, extracting this information has often relied on human labor. To the extent that existing machine-based methods have been used to extract the product/service information from web pages, the existing machine-based methods have been unable to automatically collect and categorize the product/service information with sufficient accuracy, especially when the product/service information belongs to different merchants. What is needed is a system and method that can automatically scan and analyze the web pages of different merchants to extract the desired information (e.g., product prices), regardless of who the merchants are or what online platforms the merchants use to conduct the transactions.

BRIEF DESCRIPTION OF THE FIGS

Figure 1:
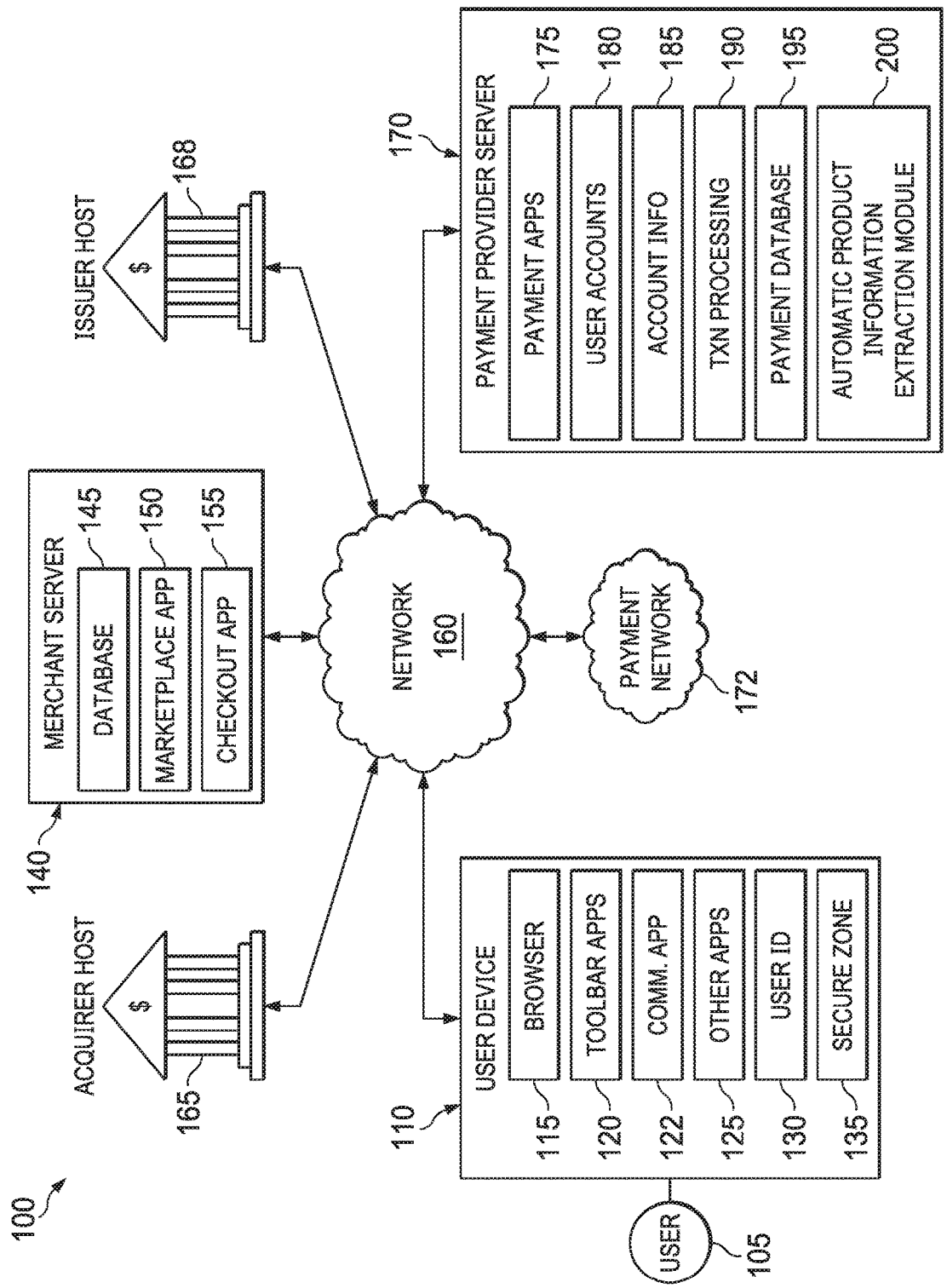
FIG. 1 is a block diagram of a networked system according to various aspects of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

The present disclosure pertains to automatically extracting data from web pages of a plurality of different merchants and analyzing the extracted data using computer scripts and/or machine learning to produce accurate and easy-to-understand results. As electronic commerce continues to thrive, more and more merchants offer their products/services online via their respective web pages. These web pages typically contain information such as the categories of products/services offered for sale and their respective prices. When such information is compiled across a plurality of different merchants, it may offer valuable insight, including but not limited to industry trends and each merchant's pricing strategy, size, and geographical location. Unfortunately, existing methods of extracting and compiling the information from merchants' web pages have relied heavily on human labor, which may be slow, inefficient, and inaccurate. To exacerbate the problem, the products offered by each merchant and the prices of the products may also change periodically, which may render the information gathered by humans quickly outdated. To the extent that machine-automated processes have been used to accomplish some of these tasks discussed above, they are typically only compatible with (or customized for) a particular merchant's web page or a predefined list of merchants' web pages.

In contrast to the conventional approaches, the present disclosure involves a machine-automated and merchant-agnostic process to extract, analyze, and compile the data from a plurality of merchants' web pages, where the merchants could be any merchant and need not belong to a predefined list. For example, a machine-automated process (which may utilize machine-learning) is used to identify a list of web pages that are inventory pages, which contain product information including the product name and price. Once the list of inventory pages is identified, each inventory page is electronically scanned to extract the product information (e.g., product name and price) for all products offered for sale on that inventory page. The electronic scanning of the inventory pages may be performed using a computer script. With the extracted product information on hand, an entity (e.g., a PayPal provider, a business analyst, or a merchant) can generate an output that includes a listing of the products and the respective product information (e.g. price). The various aspects of the present disclosure are discussed in more detail with reference to FIGS. 1-8.

FIG. 1 is a block diagram of a networked system 100 or architecture suitable for conducting electronic online transactions according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or other suitable server-based OS. It can be appreciated that the servers illustrated in FIG.

1 may be deployed in other ways and that the operations performed and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, an issuer host 168, and a payment network 172 that are in communication with one another over a network 160. Payment provider server 170 may be maintained by a payment service provider, such as PayPal™, Inc. of San Jose, Calif. A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100. User device 110 may also include other applications 125, for example the mobile applications that are downloadable from the Appstore™ of APPLE™ or GooglePlay™ of GOOGLE™.

In conjunction with user identifiers 130, user device 110 may also include a secure zone 135 owned or provisioned by the payment service provider with agreement from device manufacturer. The secure zone 135 may also be part of a telecommunications provider SIM that is used to store appropriate software by the payment service provider capable of generating secure industry standard payment credentials as a proxy to user payment credentials based on user 105's credentials/status in the payment providers system/age/risk level and other similar parameters.

Still referring to FIG. 1, merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 360 to browser 115 of user device 110. In one embodiment, user 105 may interact with marketplace application 150 through browser applications over network 160 in order to view various products, food items, or services identified in database 145.

According to various aspects of the present disclosure, the merchant server 140 may also host a website for an online marketplace, where sellers and buyers may engage in purchasing transactions with each other. The descriptions of the items or products offered for sale by the sellers may be stored in the database 145. For example, the descriptions of the items may be generated (e.g., by the sellers) in the form of text strings. These text strings are then stored by the merchant server 140 in the database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, as described herein. As such, transaction processing application 190 may store details of an order from individual users, including funding source used, credit options available, etc. Payment application 175 may be further configured to determine the existence of and to manage accounts for user 105, as well as create new accounts if necessary.

According to various aspects of the present disclosure, an automatic product information extraction module 200 may also be implemented on the payment provider server 170. The automatic product information extraction module 200 may include one or more software applications or software programs that can be automatically executed (e.g., without needing explicit instructions from a human user) to perform certain tasks. For example, the automatic product information extraction module 200 may electronically access a plurality of web pages of a plurality of merchants to identify which of these web pages are inventory pages. In some embodiments, the determination of which web pages are inventory pages may involve machine learning, for example a machine learning process based on Tensorflow. In other embodiments, the determination of which web pages are inventory pages may involve using a computer script to search for recurring HyperText Markup Language (HTML learning) elements in the web pages. It is understood that the scanning for recurring HTML learning elements may be combined with the machine learning process in some embodiments to achieve a more accurate result.

Once the inventory pages are identified, the automatic product information extraction module 200 may perform an electronic scanning process on these pages to extract product information, including but not limited to the product names and prices. For example, this electronic scanning process may scan the recurring HTML learning elements for the presence of a number and a currency symbol, since product prices usually contain a number and a currency symbol. In some embodiments, the electronic scanning process may look for discounts on prices. This may be done by analyzing a Cascading Style Sheets (CSS) style of each of the scanned web pages. Such an analysis may yield information with respect to whether the CSS style contains text-decoration, a font color other than a main font color, or a font weight exceeding a predefined threshold, which may be common indicators of a product being discounted.

Once the product information has been extracted, the automatic product information extraction module 200 may generate an output that includes the extracted product information. For example, the output may include a listing of the different products and their respective prices in a table or a spreadsheet. If any discount analysis is performed, the discounted price may be displayed alongside the original price. Based on the above, the automatic product information extraction module 200 can automate the product information extraction and analysis without substantial human involvement, and it may be done in a merchant-agnostic manner in the sense that the automatic product information extraction module 200 does not need to know how the merchants are configuring their inventory pages or how the products and prices are displayed/arranged. As such, the automatic product information extraction module 200 (and the server 170 on which it is implemented) is much more versatile and powerful than conventional systems and offers an improvement in computer technology.

It is noted that although the automatic product information extraction module 200 is illustrated as being separate from the transaction processing application 190 in the embodiment shown in FIG. 1, the transaction processing application 190 may implement some, or all, of the functionalities of the automatic product information extraction module 200 in other embodiments. In other words, the automatic product information extraction module 200 may be integrated within the transaction processing application 190 in some embodiments. In addition, it is understood that the automatic product information extraction module 200 (or another similar program) may be implemented on the merchant server 140, or even on a portable electronic device similar to the user device 110 as well. It is also understood that the automatic product information extraction module 200 may include one or more sub-modules that are configured to perform specific tasks. For example, the automatic product information extraction module 200 may include a sub-module to determine the which of the merchant web pages are inventory pages, as discussed below in more detail.

Still referring to FIG. 1, the payment network 172 may be operated by payment card service providers or card associations, such as DISCOVER™, VISA™, MASTER-CARD™, AMERICAN EXPRESS™, RUPAY™, CHINA UNION PAY™, etc. The payment card service providers may provide services, standards, rules, and/or policies for issuing various payment cards. A network of communication devices, servers, and the like also may be established to relay payment related information among the different parties of a payment transaction.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at or with various merchants who agreed to accept the payment card.

Figure 2:
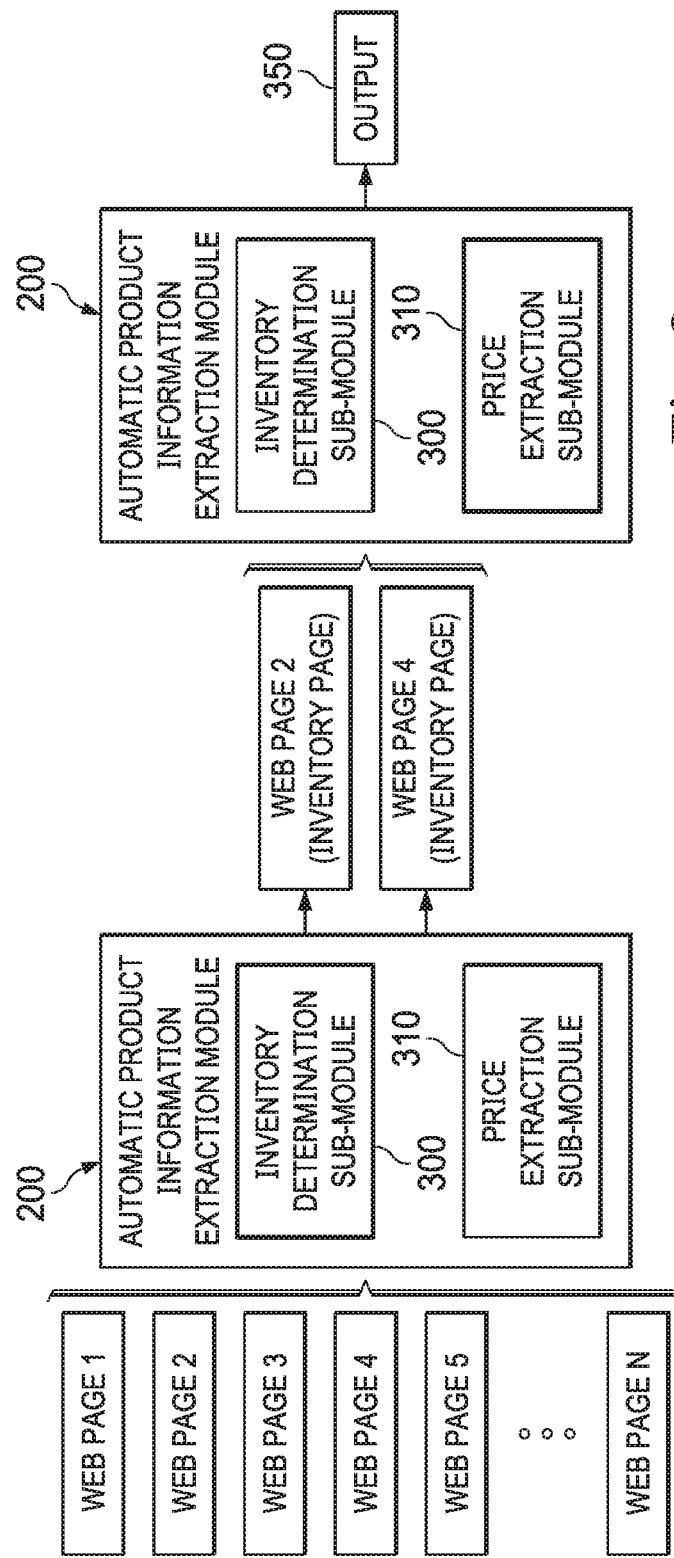
FIG. 2 is a block diagram illustrating the extraction and analysis of product information from web pages according to various aspects of the present disclosure.

FIG. 2 is a simplified block diagram illustrating a process in which the inventory pages are identified. Referring to FIG. 2, a plurality of web pages 1-N is provided. Each of the web pages 1-N may be a web page of a merchant, but it is possible that each merchant may own multiple ones of the web pages 1-N. For example, web page 1 and web page 2 may both belong to a first merchant, which may be a merchant specializing in selling consumer electronic products. However, web page 1 and web page 2 may be different types of web pages. As an example, web page 1 may be a web page that explains what the first merchant is and may contain the contact information about the first merchant, whereas web page 2 may be a web page that includes the inventory of the first merchant. Similarly, web page 3, web page 4, and web page 5 may all be different types of web pages of a second merchant that is specializing in selling clothing. As an example, web page 3 may be a home page of the second merchant, web page 4 may be the inventory page of the second merchant, and web page 5 may be a user account login page of the second merchant.

In some embodiments, only the main pages (e.g., home pages) of the merchants are provided to the entity that operates the automatic product information extraction module 200 initially. In that case, the automatic product information extraction module 200 may include a crawler or another machine-automated method to search for other web pages of the merchant associated with the main page, for example web pages that branch out from the main page. The automatic product information extraction module 200 may then aggregate all these web pages together to generate a listing of the web pages 1-N.

As discussed above, although the information containing the product names and prices is readily available from the web pages 1-N (for example via the inventory pages), conventional methods have not devised an efficient and reliable machine-automated way to extract such information. In contrast, the present disclosure implements the automatic product information extraction module 200 to extract the product information efficiently and accurately without having any prior knowledge of the setup or configuration of the web pages 1-N.

In more detail, the automatic product information extraction module 200 includes an inventory determination sub-module 300. As a first step, the determination sub-module 300 electronically accesses each of the web pages 1-N to determine which of the web pages 1-N is actually an inventory page. In some embodiments, the inventory determination sub-module 300 makes such a determination through machine learning. As a part of the machine learning process, a human agent may browse through a few of the web pages and tag the web pages that should be considered inventory pages, for example because these pages contain a listing of products or services and their respective prices. These manually tagged web pages may be used as training data for the machine learning process. The machine learning process may identify common features in these manually tagged web pages, scan new web pages, and look for the common features in the new web pages (e.g., the web pages 1-N). The machine learning process may then predict which of the new web pages are inventory pages. In some embodiments, the machine learning process is executed using a TensorFlow platform, which is an end-to-end open source platform that includes a plurality of tools, libraries, and community resources that enable machine learning developers to build and deploy machine learning applications. The various aspects of the machine learning process are discussed in more detail below with reference to FIG. 6.

In some embodiments, the inventory determination sub-module 300 may include a specially programmed computer script to identify the inventory pages via HTML learning scanning. In more detail, if a web page is an inventory page, it should contain a listing of products and their respective prices. Often times, each product is also accompanied by a picture or an image showing what the product looks like. These products and prices (and images when applicable) should be arranged in an HTML learning skeletal structure that is recurring, since there are many products that presumptively should also be formatted in a same (or at least similar) way on the web page. In terms of HTML learning code, the inventory pages should have recurring child element HTML learning structures that share a common parent HTML learning structure.

Figure 3:
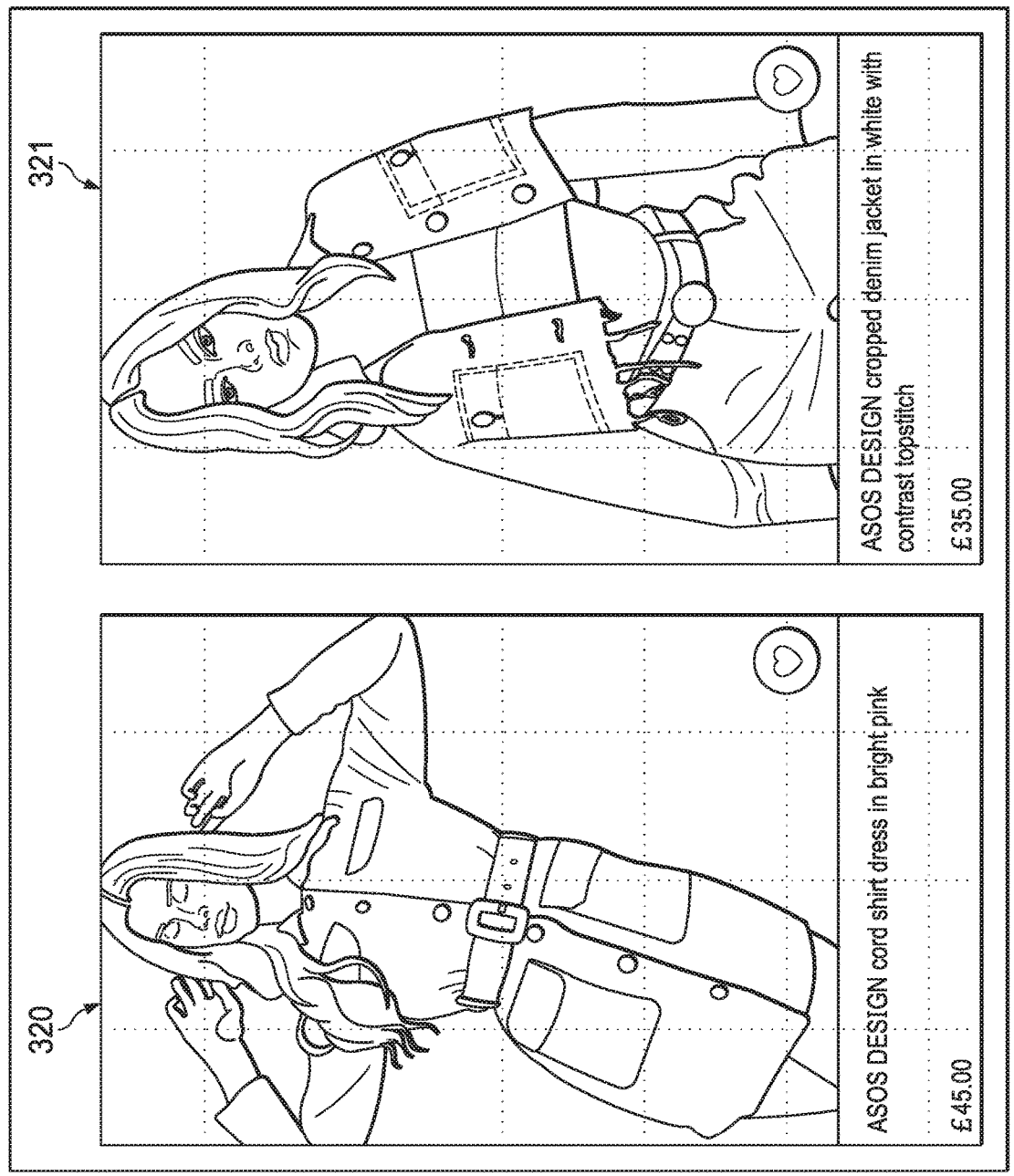
FIGS. 3-4 illustrate simplified portions of web pages according to various aspects of the present disclosure.

As an example, FIG. 3 illustrates a portion of an example inventory page, which lists various types of women's clothing as products 320 and 321. The product 320 may be an ASOS DESIGN cord shirt dress in bright pink, with the price of £45.00. The product 321 may be an ASOS DESIGN cropped denim jacket in white with contrast topstich, with the price of £35.00. It is understood that only two products 320-321 are illustrated in the web page of FIG. 3 for reasons of simplicity. The web page of FIG. 3 may include many more products that are arranged and/or styled similarly as the products 320-321.

The HTML learning code corresponding to this portion of the inventory page shown in FIG. 3 is provided below:

<section data-auto-id="1">
<article id="product-13708728" data-auto-id="productTile" class="_2qG85dG">
<a class="_3TqU78D" href="https://www.asos.com/asos-design/asos-design-cord-shirt-dress-in-bright-pink/prd/13708728?clr=&colourWayId=16559312&SearchQuery=&cid=13509" aria-label="ASOS DESIGN cord shirt dress in bright pink, Price: £45.00"><div class="_3Lld6NN"><img alt="ASOS DESIGN cord shirt dress in bright pink" data-auto-id="productTileImage" sizes="(min-width: 768px) 317px, 238px" loading="lazy" src="//images.asos-media.com/products/asos-design-cord-shirt-dress-in-bright-pink/13708728-1-pink?$n_480w$&wid=476&fit=constrain" srcset="//images.asos-media.com/products/asos-design-cord-shirt-dress-in-bright-pink/13708728-1-pink?$n_240w$&wid=238&fit=constrain 238w,//images.asos-media.com/products/asos-design-cord-shirt-dress-in-bright-pink/13708728-1-pink?$n_320w$&wid=317&fit=constrain 317w,//images.asos-media.com/products/asos-design-cord-shirt-dress-in-bright-pink/13708728-1-pink?$n_480w$&wid=476&fit=constrain 476w,//images.asos-media.com/products/asos-design-cord-shirt-dress-in-bright-pink/13708728-1-pink?$n_640w$&wid=634&fit=constrain 634w,//images.asos-media.com/products/asos-design-cord-shirt-dress-in-bright-pink/13708728-1-pink?$n_750w$&wid=714&fit=constrain 714w,//images.asos-media.com/products/asos-design-cord-shirt-dress-in-bright-pink/13708728-1-pink?$n_960w$&wid=952&fit=constrain 952w"></div></a>
</article>
<article id="product-14084798" data-auto-id="productTile" class="_2qG85dG">
<a class="_3TqU78D" href="https://www.asos.com/asos-design/asos-design-cropped-denim-jacket-in-white-with-contrast-topstitch/prd/14084798?clr=&colourWayId=16590274&SearchQuery=&a mp;cid=13509" aria-label="ASOS DESIGN cropped denim jacket in white with contrast topstitch, Price: £35.00"><div class="_3Lld6NN"><img alt="ASOS DESIGN cropped denim jacket in white with contrast topstitch" data-auto-id="productTileImage" sizes="(min-width: 768px) 317px, 238px" loading="lazy" src="//images.asos-media.com/products/asos-design-cropped-denim-jacket-in-white-with-contrast-topstitch/14084798-1-white?$n_480w$&wid=476&fit=constrain" srcset="//images.asos-media.com/products/asos-design-cropped-denim-jacket-in-white-with-contrast-topstitch/14084798-1-white?$n_240w$&wid=238&fit=constrain 238w,//images.asos-media.com/products/asos-design-cropped-denim-jacket-in-white-with-contrast-topstitch/14084798-1-white?$n_320w$&wid=317&fit=constrain 317w,//images.asos-media.com/products/asos-design-cropped-denim-jacket-in-white-with-contrast-topstitch/14084798-1-white?$n_480w$&wid=476&fit=constrain 476w,//images.asos-media.com/products/asos-design-cropped-denim-jacket-in-white-with-contrast-topstitch/14084798-1-white?$n_640w$&wid=634&fit=constrain 634w,//images.asos-media.com/products/asos-design-cropped-denim-jacket-in-white-with-contrast-topstitch/14084798-1-white?$n_750w$&wid=714&fit=constrain 714w,//images.asos-media.com/products/asos-design-cropped-denim-jacket-in-white-with-contrast-topstitch/14084798-1-white?$n_960w$&wid=952&fit=constrain 952w"></div></a>
</article>
</section>

In the above HTML learning code example, there is a common HTML learning parent to both of the products 320 and 321, which is "section". See the HTML learning code "<section data-auto-id="1">" at the beginning and "</section>" at the end. The child element refers to the HTML learning code defined by the <div> element, which corresponds to the HTML learning code that describes each of the products 320 and 321. The <div> element is often used as a container for other HTML learning elements for styling (such as Cascading Style Sheets (CSS) styling) or for execution of other tasks by Javascript. As an example of the styling, the <div> element may define a container that, using CSS styling, specifies that each of the products 320-321 is displayed in a box with a yellow (or another suitable color) border by the web page. Note that although the <div> element is a child element in the above example, it may also serve as a parent element in other cases, for example where there are repeating HTML learning structures within the <div> element. As such, a <div> element (or another HTML learning element) may be a parent element to a first set of HTML learning elements and also a child element to a second HTML learning element at the same time.

In the HTML learning code example above, there are recurring HTML learning elements that have identical structures/skeletons, for example the HTML learning code of:
   <article data-auto-id="productTile" class="_2qG85dG>
     <a class="_3TqU78D">
        <div class="_3Lld6NN"><img></div></a></article>

Both of the products 320 and 321 have this above structure. In other words, the above structure is recurring. This recurrence is detected by the inventory determination submodule 300, for example using a computer script that is implemented as a part of the inventory determination submodule 300. An example computer script for the detection of recurring HTML learning elements is provided below:

```
def get_same_structure_a(soup,url):
    items = { }
    all_map = { }
    for child in soup.find_all('a'):
        if not child.has_attr('img'):
            continue
        key = clean_text(child)
        if key not in all_map:
            all_map[key] = []
        all_map[key].append(child)
    for candidate_arr in all_map.values():
        if len(candidate_arr) >= 2 and same_parent(candidate_arr):
            for elem in candidate_arr:
                if elem.name == 'script':
                    continue
                if elem.text and len(elem.text.strip()) > 0:
                    if has_price(elem.text.strip()):
                        items[elem] = clean_tags(elem)
    num_of_items = create_result(items,url)
    return num_of_items
```

-continued

```
def clean_text(element):
    cloned_el = copy.copy(element)
    cloned_el.attrs = {key:value for key,value in cloned_el.attrs.items() if
key=='class'}
    all_els = [e for e in cloned_el.descendants if e.name is not None]
    for tag in all_els:
            tag.attrs = {key:value for key,value in tag.attrs.items() if key=='class'}
        tag.string =''
    return cloned_el
    def same_parent(candidate_arr):
    parent = candidate_arr[0].parent
    filtered = [x for x in candidate_arr if x.parent == parent]
    return len(filtered) == len(candidate_arr)
```

It is understood that the above computer script is merely a non-limiting embodiment of a portion of the inventory determination sub-module 300 for detecting recurring HTML learning structures in web pages. Other suitable computer scripts may be implemented in the inventory determination sub-module 300 to detect the recurring HTML learning structures in other embodiments. Regardless of how the recurring HTML learning structures are detected, once the inventory determination sub-module 300 detects the presence of recurring HTML learning in a web page, it may identify it as an inventory page.

It is understood that the two methods of identifying inventory pages—using the machine learning process and using the detection of recurring HTML learning structures—need not be mutually exclusive. In other words, although the inventory determination sub-module 300 may rely on either machine learning or the detection of recurring HTML learning structures to identify inventory pages, it may also utilize a combination of these two methods to enhance the accuracy of the identification of the inventory pages. For example, the inventory determination sub-module 300 may first use machine learning to go through all of the web pages (e.g., web pages from all known merchants on file, such as the web pages 1-N in FIG. 2) that could potentially be inventory pages. The machine learning process may label a first subset of these web pages as preliminary inventory pages. The inventory determination sub-module 300 may then use the above computer script (or a similar script) to scan the first subset of the web pages (i.e., labeled as the preliminary inventory pages) to look for the presence of recurring HTML learning structures. If the scanned page does have recurring HTML learning structures, that page is confirmed by the inventory determination sub-module 300 to be a true inventory page. However, if the scanned page does not have recurring HTML learning structures, then the inventory determination sub-module 300 may presume that the machine learning process returned a false positive. As such, the page lacking the recurring HTML learning structures may be identified as a non-inventory page.

Returning to FIG. 2, the inventory determination sub-module 300 may use such the processes discussed above (e.g., machine learning, detection of recurring HTML learning structures, or a combination thereof) to determine which of the web pages 1-N should be identified as inventory pages. As a simplified example result, web page 2 and web page 4 may be identified as inventory pages. For these identified inventory pages such as web pages 2 and 4, the automatic product information extraction module 200 may extract the production information such as prices for each of the products. In that regard, the automatic product information extraction module 200 may include a price extraction sub-module 310, which is configured to scan the content of the identified inventory pages to extract the prices. Presumptively, the price may be a combination of at least a number and a currency symbol, and it is typically in one of the following forms:

Number (may contain ".",",") symbols) Optional space character Currency symbol (one of $,€, etc.) Optional "-" symbol (for the range of prices); or Currency symbol (one of $,€, etc.) Optional space character Number (may contain ".",",") symbols) Optional "-" symbol (for the range of prices); or Number (may contain ".",",") symbols) Optional space character Currency abbreviation (one of USD,EUR, etc.) Optional "-" symbol (for the range of prices); or Currency abbreviation (one of USD,EUR, etc.) Optional space character Number (may contain ".",",") symbols) Optional "-" symbol (for the range of prices)

Based on the above presumption, the price extraction sub-module 310 may match each of the potential products in the identified inventory pages with a predefined search pattern that covers one of the presumptive price forms listed above. In some embodiments, the price extraction sub-module 310 may define the search pattern using a Regex (also referred to as a regular expression), which may include a sequence of characters such as:

[\d,.]+[\u0020]?[\$\xA2\xA5\u058F\u060B\u09F2\u09F3\
u09FB\u0AF1\u0BF9\u0E3F\u17DB\u20A0-\u20BD\
uA838\uFDFC\uFE69\uFF04\uFFE0\uFFE1\
uFFE5\uFFE6\u5186][\s]?[-]?[-]?|[\$\xA2\xA5\u058F\
u060B\u09F2\u09F3\u09FB\u0AF1\u0BF9\u0E3F\
u17DB\u20A0-\u20BD\uA838\uFDFC\uFE69\uFF04\
uFFE0\uFFE1\uFFE5\uFFE6\u5186][\s]?[\d,.]+[\s]?[-]?
[-]?lkr[\s]?[\]+'l'(?:[\d,.]+[\u0020]?(?:USD|EUR|CHF|
CAD)[\s]?[-]?[-]?)|(?:(?:USD|EUR|CHF|CAD)[\s]?[d,.]+
[\s]?[-]?[-]?[\s][\d,]+)'

The Regex command (or another suitable pattern search algorithm) may return a list of potential prices for products in an inventory page. In order to associate a price with a product and to provide a product description, the price extraction sub-module 310 may use the innerText command to extract the text (e.g., assumed to be the product description) of the HTML learning element that contains the prices. If the HTML learning containing the price does not have any text, it may indicate that the product description is embedded in the image or the link associated with the price. As such, the price extraction sub-module 310 may extract the "alt" attribute (which provides an alternate text for an image) of the <img> element inside the price elements, or it may extract the "href" attribute (which specifies the URL of the page the link is pointing) of the <a> element inside the price elements.

In some cases, a parent HTML learning element and a child HTML learning element may both contain prices.

Accordingly, the pattern search discussed above may yield both the parent HTML learning element and the child HTML learning element, even though the parent HTML learning element and the child HTML learning element correspond to the same underlying product/price. In order to avoid the duplication of the price reporting in the desired output, the price extraction sub-module 310 may eliminate the prices extracted from parent HTML learning elements from the output, thereby leaving only the prices extracted from the most granular child HTML learning elements in the output.

Furthermore, in some embodiments, the price extraction sub-module 310 may search for common prefixes and/or suffixes in the product description and remove them from the product description in its generated output. This is because certain common prefixes and/or suffixes are not truly parts of the product descriptions. As an example, a merchant web site may repeatedly put phrases such as "On sale now!", "Just arrived!", "Brand new!", or "Today only" before or after every product listed on the web site. These phrases should be removed from the output of the price extraction sub-module 310, since they are not uniquely describing the underlying product itself. However, this is not necessarily always the case. For example, a merchant may sell different types of APPLE™ IPHONEs™ (e.g., IPHONE™ 7, IPHONE™ 8, or IPHONE™ X) or SAMSUNG™ GALAXY™ phones (e.g., SAMSUNG™ GALAXY™ S9, SAMSUNG™ GALAXY™ S9 PLUS, SAMSUNG™ GALAXY™ NOTE 10). In these cases, the common prefixes and/or suffixes may truly be a part of the product description. To resolve this issue, the price extraction sub-module 310 may be configured to remove prefixes and/or suffixes that are longer than an X number of words (e.g., more than 1 word or more than 2 words) in some embodiments. In other embodiments, the price extraction sub-module 310 may include the common prefixes and/or suffixes just for the first product in the generated output but may omit them from the rest of the products in the generated output.

Based on the above, the price extraction sub-module 310 may generate an output 350 that includes a list of products (including their respective names) and their corresponding prices for each scanned inventory page. As an example, if the web page shown in FIG. 3 is scanned by the price extraction sub-module 310, the following output may be generated:

| URL | Product Description | Price |
| --- | --- | --- |
| https://www.asos.com/asos-design/asos-design-cord-shirt-dress-in-bright-pink/prd/13708728?clr=&colourWayId=16559312&SearchQuery=&cid=13509" | ASOS DESIGN cord shirt dress in bright pink | £45.00 |
| https://www.asos.com/asos-design/asos-design-cropped-denim-jacket-in-white-with-contrast-topstitch/prd/14084798?clr=&colourWayId=16590274&SearchQuery=&cid=1350 | ASOS DESIGN cropped denim jacket in white with contrast topstitch | £35.00 |

The generated output 350 may be easily viewed by a human user and may also be exported to a computer-based processing tool such as an electronic spreadsheet (e.g., MICROSOFT™ EXCEL™) for further data analysis. In some embodiments, the further data analysis may yield valuable insight such as industry trends or pricing fluctuations, and such insight may be used to gain competitive advantages.

In some embodiments, the price extraction sub-module 310 may also analyze the CSS style of the scanned inventory pages to determine whether any of the listed products on that web page are being discounted. In that regard, web pages may be built by HTML learning or CSS. Whereas HTML learning code may specify the content (e.g., headings, paragraphs, or images) of the web page, CSS is the language for describing the presentation of the web page, including colors, layout, and fonts of texts on the page. CSS allows the presentation of the web page to be adapted to different types of devices, such as large screens, small screens, or printers. CSS is independent of HTML learning and can be used with any XML learning-based markup language.

Figure 4:
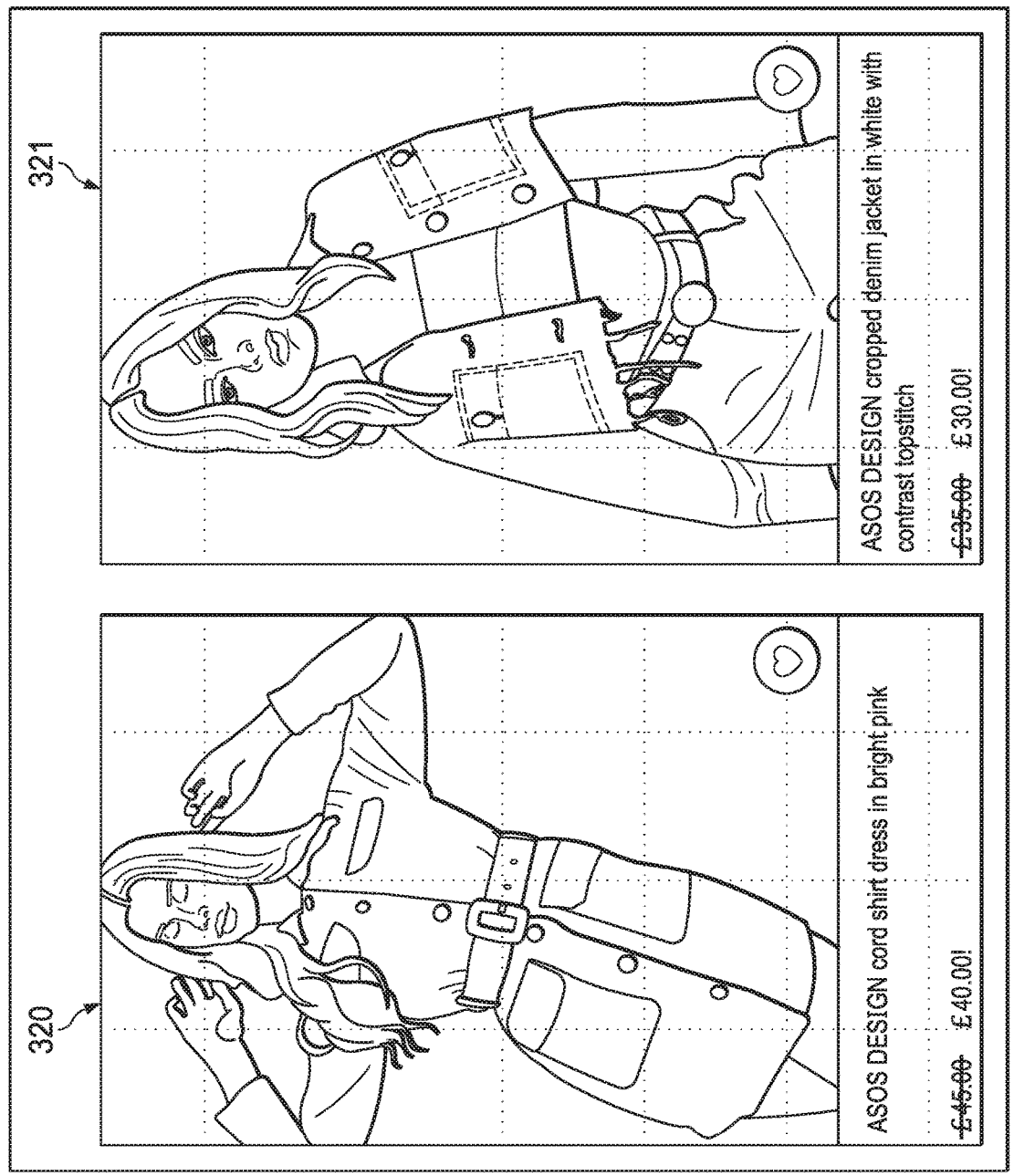

It is a common practice to discount products from time to time. FIG. 4 illustrates a scenario where the products 320-321 of the inventory page shown in FIG. 3 are being discounted. For example, the product 320 is being discounted from £45.00 to £40.00, and the product 321 is being discounted from £35.00 to £30.00. According to the various aspects of the present disclosure, a presumption is made that when a product in an inventory page is being discounted, its styling or appearance may indicate as such. This is illustrated in FIG. 4, where the original price of £45.00 for product 320 has a strikethrough, and the new price of £40.00 for the product 320 has a bigger font size, a different color (e.g., a new color of red versus the original color of black), or has undergone a text decoration such as being italicized, underlined, or bolded, etc. The same is true for the new price of £30.00 for the product 321. In addition, although not depicted herein, other visual appearance changes may include using a different type font for the new price, placing the new price in a more prominent area, or displaying text such as "on sale" or "discount" next to the new price, etc. Furthermore, the original price may or may not undergo visual appearance changes in the web page showing the discounted price.

These visual appearance changes may be detected by analyzing the CSS style of the web page. For example, below is the code for a computer script (as a part of the price extraction sub-module 310) for analyzing the CSS style of a web page to detect one or more of these visual appearance changes:

```
for (let element in products) {
    let style=window.getComputedStyle(element);
    let fontWeight=style.getPropertyValue('font-weight')
    let isBold=fontWeight==='bold'||fontWeight>=700
    let isReducedPrice=style.getPropertyValue('text-decoration')==='line-through'
}
```

In some embodiments, machine learning may be used to perform at least a part of the CSS style analysis. For example, training data corresponding to one or more CSS styles may be gathered. The training data may help identify whether an identified price corresponds to a discount, since the training data may reveal which features correspond to CSS characteristics. For example, the training data may include one or more instances of webpage elements that correspond to a discounted price as well as the corresponding CSS style characteristics associated with the webpage elements. The training data may be used to train the machine learning model so that eventually the machine learning process can make such a determination (e.g., which elements within a web page have CSS style characteristics that indicate price discounts or price changes, etc.). In some embodiments, the determination of whether the CSS style characteristics indicate price discounts may include comparing CSS style characteristics to a database containing known CSS style characteristics that correspond to discounts. Via such a comparison, a determination can quickly be made as to whether the CSS style changes in a given web page corresponds to a price discount. Note that although a discounted price is more common, the new price may be a price increase in some cases too, which could also be detected by the CSS style analysis.

In some embodiments, after using CSS style analysis to detect the price candidates that have undergone visual appearance changes such as font size increase, underlining, bolding, and/or color changes, the price extraction sub-module 310 compares the prices of these candidates with the original prices, respectively. If the new price is lower than the original price for a product, the price extraction sub-module 310 deems that product as being discounted. After analyzing all the products on an inventory page, the price extraction sub-module 310 may generate a new output that includes both the original price and the new price, for example in the form of the table below:

| URL | Product Description | New Price | Old Price |
| --- | --- | --- | --- |
| https://www.asos.com/asos-design/asos-design-cord-shirt-dress-in-bright-pink/prd/13708728?clr=&colourWayId=16559312&SearchQuery=&cid=13509" | ASOS DESIGN cord shirt dress in bright pink | £45.00 | £40.00 |
| https://www.asos.com/asos-design/asos-design-cropped-denim-jacket-in-white-with-contrast-topstitch/prd/14084798?clr=&colourWayId=16590274&SearchQuery=&cid=1350 | ASOS DESIGN cropped denim jacket in white with contrast topstitch | £35.00 | £30.00 |

In some embodiments, the output (such as the table above) may be generated for each merchant individually. In other embodiments, the output (such as the table above) may be generated in an aggregated manner for all the merchants, or for predefined groups of merchants, such as merchants in a particular retail space/sector. Furthermore, it is understood that although the example output above may include a listing of both the new price and the old price side by side, in some embodiments the new price may replace the old price. In other words, if the CSS style analysis indicates that a product has been discounted, then the old price is removed and replaced by the new price.

Figure 5:
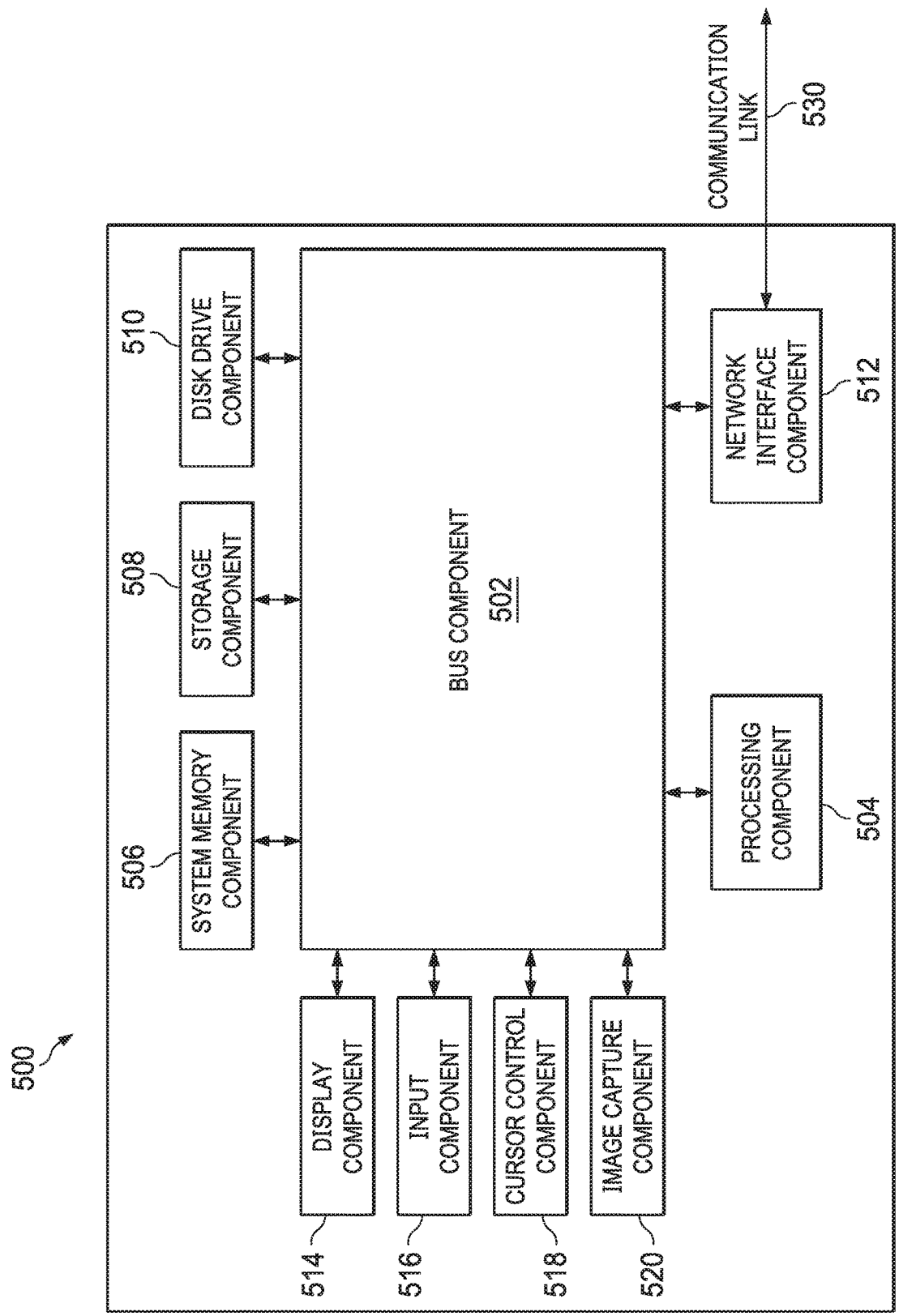
FIG. 5 is an example computer system according to various aspects of the present disclosure.

FIG. 5 is a block diagram of a computer system 500 suitable for implementing various methods and devices described herein, for example, the automatic product information extraction module 200, or the user device 110, the merchant server 140, or the payment provider server 170. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the automatic product information extraction module 200 and the various method steps of the method 800 discussed below (or the user device 110, the merchant server 140, or the payment provider server 170) may be implemented as the computer system 500 in a manner as follows.

In accordance with various embodiments of the present disclosure, the computer system 500, such as a network server or a mobile communications device, includes a bus component 502 or other communication mechanisms for communicating information, which interconnects subsystems and components, such as a computer processing component 504 (e.g., processor, micro-controller, digital signal processor (DSP), etc.), system memory component 506 (e.g., RAM), static storage component 508 (e.g., ROM), disk drive component 510 (e.g., magnetic or optical), network interface component 512 (e.g., modem or Ethernet card), display component 514 (e.g., cathode ray tube (CRT) or liquid crystal display (LCD)), input component 516 (e.g., keyboard), cursor control component 518 (e.g., mouse or trackball), and image capture component 520 (e.g., analog or digital camera). In one implementation, disk drive component 510 may comprise a database having one or more disk drive components.

In accordance with embodiments of the present disclosure, computer system 500 performs specific operations by the processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of (or in combination with) software instructions to implement the present disclosure. In some embodiments, the various components of the automatic product information extraction module 200 may be in the form of software instructions that can be executed by the processor 504 to automatically perform context-appropriate tasks on behalf of a user.

Logic may be encoded in a computer readable medium, which may refer to any medium that participates in providing instructions to the processor 504 for execution. Such a medium may take many forms, including but not limited to, non-volatile media and volatile media. In one embodiment, the computer readable medium is non-transitory. In various implementations, non-volatile media includes optical or magnetic disks, such as disk drive component 510, and volatile media includes dynamic memory, such as system memory component 506. In one aspect, data and information related to execution instructions may be transmitted to computer system 500 via a transmission media, such as in the form of acoustic or light waves, including those generated during radio wave and infrared data communications. In various implementations, transmission media may include coaxial cables, copper wire, and fiber optics, including wires that comprise bus 502.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. These computer readable media may also be used to store the programming code for the automatic product information extraction module 200 discussed above.

In various embodiments of the present disclosure, execution of instruction sequences to practice the present disclosure may be performed by computer system 500. In various other embodiments of the present disclosure, a plurality of computer systems 500 coupled by communication link 530 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information and instructions, including one or more programs (i.e., application code) through communication link 530 and communication interface 512. Received program code may be executed by computer processor 504 as received and/or stored in disk drive component 510 or some other non-volatile storage component for execution. The communication link 530 and/or the communication interface 512 may be used to conduct electronic communications between the automatic product information extraction module 200 and external devices, for example with the user device 110, with the merchant server 140, or with the payment provider server 170, depending on exactly where the automatic product information extraction module 200 is implemented.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein. It is understood that at least a portion of the automatic product information extraction module 200 may be implemented as such software code.

Figure 6:
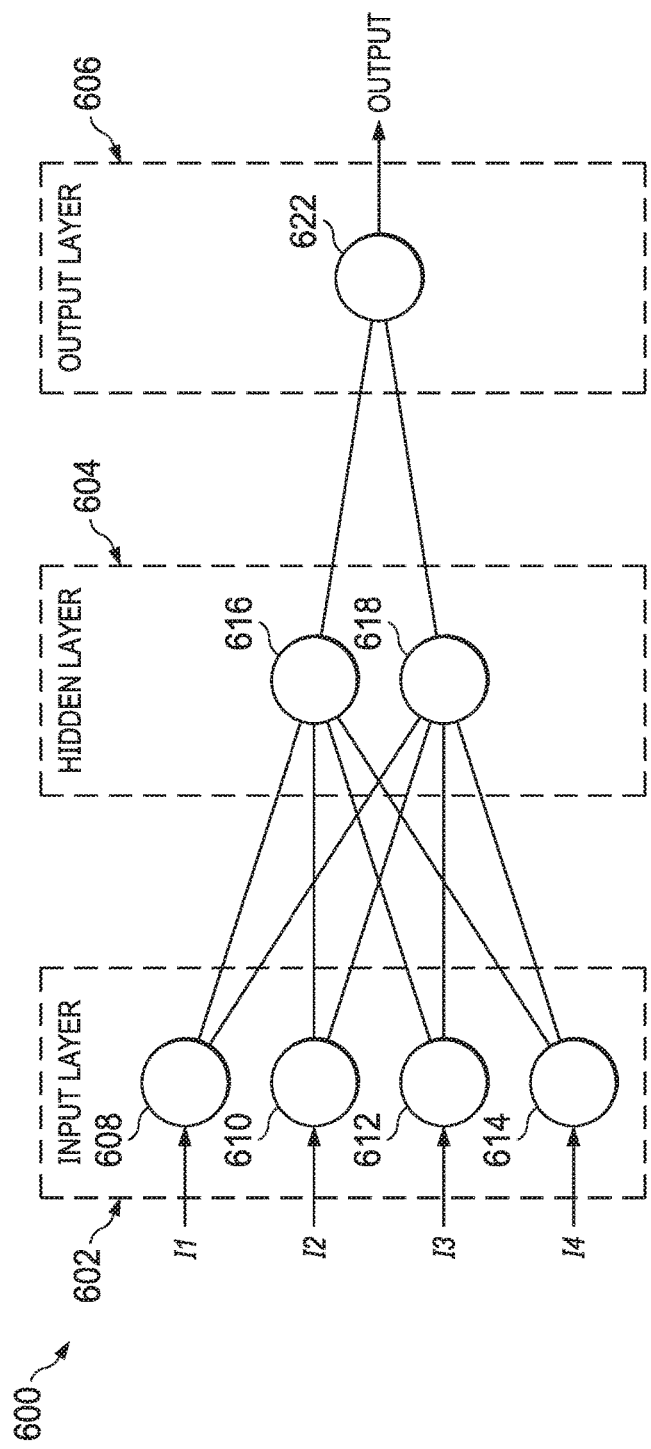
FIG. 6 illustrates an example artificial neural network according to various aspects of the present disclosure.

It is understood that machine learning may be used to refine the various aspects of the automatic product information extraction module 200. For example, machine learning may be used to identify which web pages are inventory pages, as discussed above in association with FIG. 2. In some embodiments, the machine learning may be performed at least in part via an artificial neural network. In that regard, FIG. 6 illustrates an example artificial neural network 600. As shown, the artificial neural network 600 includes three layers—an input layer 602, a hidden layer 604, and an output layer 606. Each of the layers 602, 604, and 606 may include one or more nodes. For example, the input layer 602 includes nodes 608-614, the hidden layer 604 includes nodes 616-618, and the output layer 606 includes a node 622. In this example, each node in a layer is connected to every node in an adjacent layer. For example, the node 608 in the input layer 602 is connected to both of the nodes 616-618 in the hidden layer 604. Similarly, the node 616 in the hidden layer is connected to all of the nodes 608-614 in the input layer 602 and the node 622 in the output layer 606. Although only one hidden layer is shown for the artificial neural network 600, it has been contemplated that the artificial neural network 600 used to implement the automatic product information extraction module 200 (e.g., the inventory determination sub-module 300), and the automatic product information extraction module 200 may include as many hidden layers as necessary.

In this example, the artificial neural network 600 receives a set of input values and produces an output value. Each node in the input layer 602 may correspond to a distinct input value. For example, when the artificial neural network 600 is used to implement the inventory determination sub-module 300, each node in the input layer 602 may correspond to a distinct attribute of an inventory page.

In some embodiments, each of the nodes 616-618 in the hidden layer 604 generates a representation, which may include a mathematical computation (or algorithm) that produces a value based on the input values received from the nodes 608-614. The mathematical computation may include assigning different weights to each of the data values received from the nodes 608-614. The nodes 616 and 618 may include different algorithms and/or different weights assigned to the data variables from the nodes 608-614 such that each of the nodes 616-618 may produce a different value based on the same input values received from the nodes 608-614. In some embodiments, the weights that are initially assigned to the features (or input values) for each of the nodes 616-618 may be randomly generated (e.g., using a computer randomizer). The values generated by the nodes 616 and 618 may be used by the node 622 in the output layer 606 to produce an output value for the artificial neural network 600. When the artificial neural network 600 is used to implement the automatic product information extraction module 200, the output value produced by the artificial neural network 600 may indicate a likelihood of an event (e.g., a web page being an inventory page).

The artificial neural network 600 may be trained by using training data. For example, the training data herein may be the web pages that have been tagged by human agents as inventory pages. By providing training data to the artificial neural network 600, the nodes 616-618 in the hidden layer 604 may be trained (adjusted) such that an optimal output (e.g., determining a value for a threshold) is produced in the output layer 606 based on the training data. By continuously providing different sets of training data, and penalizing the artificial neural network 600 when the output of the artificial neural network 600 is incorrect (e.g., when the determined (predicted) likelihood is inconsistent with whether the event actually occurred for the transaction, etc.), the artificial neural network 600 (and specifically, the representations of the nodes in the hidden layer 604) may be trained (adjusted) to improve its performance in data classification. Adjusting the artificial neural network 600 may include adjusting the weights associated with each node in the hidden layer 604.

Although the above discussions pertain to an artificial neural network as an example of machine learning, it is understood that other types of machine learning methods may also be suitable to implement the various aspects of the present disclosure. For example, support vector machines (SVMs) may be used to implement machine learning. SVMs are a set of related supervised learning methods used for classification and regression. A SVM training algorithm—which may be a non-probabilistic binary linear classifier—may build a model that predicts whether a new example falls into one category or another. As another example, Bayesian networks may be used to implement machine learning. A Bayesian network is an acyclic probabilistic graphical model that represents a set of random variables and their conditional independence with a directed acyclic graph (DAG). The Bayesian network could present the probabilistic relationship between one variable and another variable. Other types of machine learning algorithms are not discussed in detail herein for reasons of simplicity.

Figure 7:
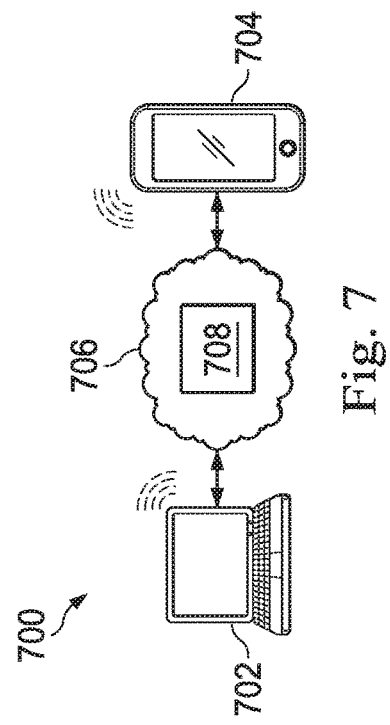
FIG. 7 is a simplified example of a cloud-based computing architecture according to various aspects of the present disclosure.

FIG. 7 illustrates an example cloud-based computing architecture 700, which may also be used to implement various aspects of the present disclosure. The cloud-based computing architecture 700 includes a mobile device 704 (e.g., the user device 110 of FIG. 1) and a computer 702 (e.g., the merchant server 140 or the payment provider server 170), both connected to a computer network 706 (e.g., the Internet or an intranet). In one example, a consumer has the mobile device 704 that is in communication with cloud-based resources 708, which may include one or more computers, such as server computers, with adequate memory resources to handle requests from a variety of users. A given embodiment may divide up the functionality between the mobile device 704 and the cloud-based resources 708 in any appropriate manner. For example, an app on mobile device 704 may perform basic input/output interactions with the user, but a majority of the processing may be performed by the cloud-based resources 708. However, other divisions of responsibility are also possible in various embodiments. In some embodiments, using this cloud architecture, the automatic product information extraction module 200 may reside on the merchant server 140 or the payment provider server 170, but its functionalities can be accessed or utilized by the mobile device 704, or vice versa.

The cloud-based computing architecture 700 also includes the personal computer 702 in communication with the cloud-based resources 708. In one example, a participating merchant or consumer/user may access information from the cloud-based resources 708 by logging on to a merchant account or a user account at computer 702. The system and method for determining the inventory pages and extracting product information (e.g., product description and pricing data) as discussed above may be implemented at least in part based on the cloud-based computing architecture 700.

It is understood that the various components of cloud-based computing architecture 700 are shown as examples only. For instance, a given user may access the cloud-based resources 708 by a number of devices, not all of the devices being mobile devices. Similarly, a merchant or another user may access the cloud-based resources 708 from any number of suitable mobile or non-mobile devices. Furthermore, the cloud-based resources 708 may accommodate many merchants and users in various embodiments.

Figure 8:
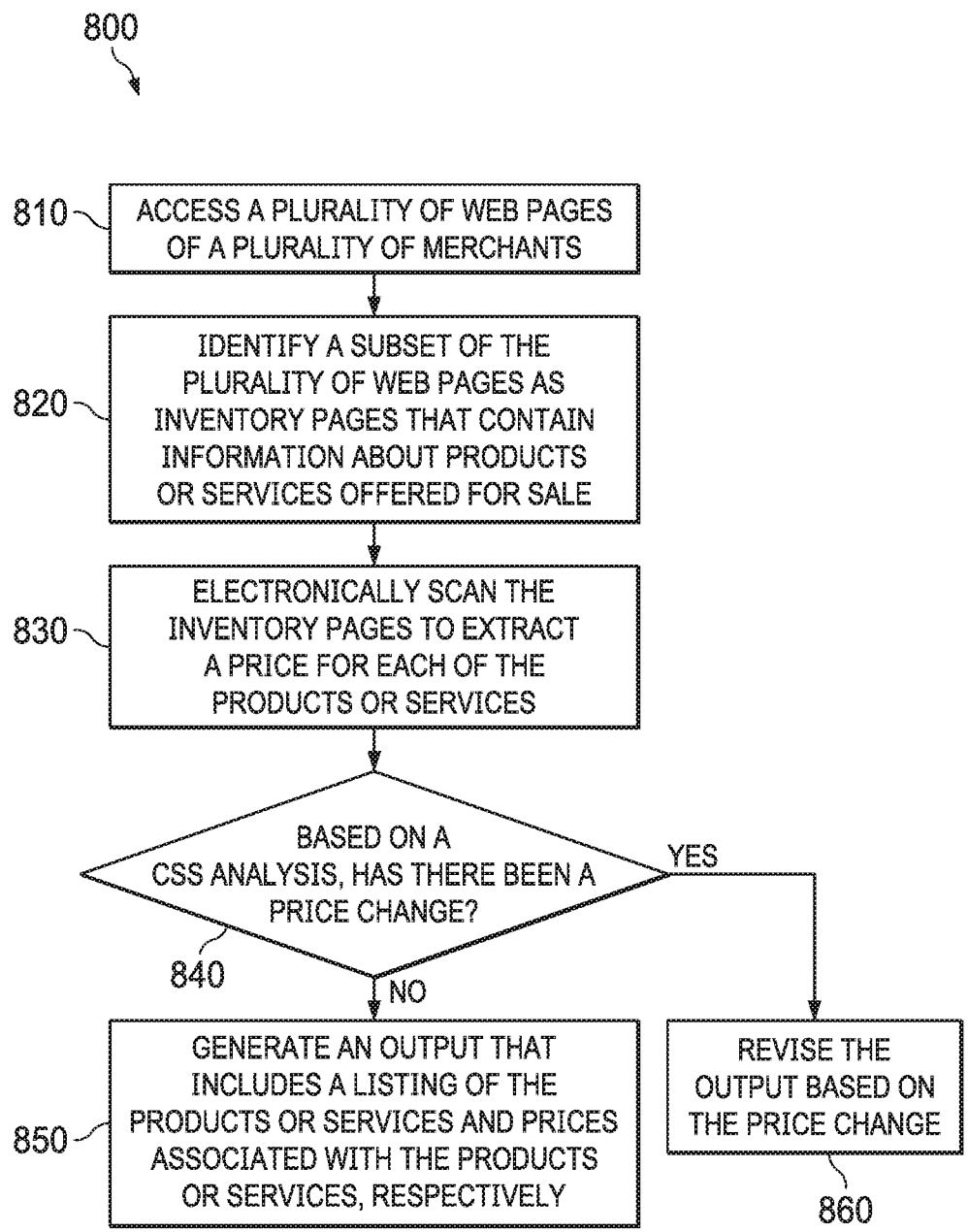
FIG. 8 is a flowchart illustrating a method of automatic data extraction from web pages and analysis thereof according to various aspects of the present disclosure.

FIG. 8 is a flowchart illustrating a method 800 for storing information in an electronic database according to various aspects of the present disclosure. The various steps of the method 800 may be performed by one or more electronic processors, for example by a the processors of a computer of an entity that may include: a payment provider, a business analyst, or a merchant. In some embodiments, at least some of the steps of the method 800 may be performed by the automatic product information extraction module 200 discussed above.

The method 800 includes a step 810 to access a plurality of web pages of a plurality of merchants.

The method 800 includes a step 820 to identify, based on the accessed plurality of web pages, a subset of the plurality of web pages as inventory pages that contain information about products or services offered for sale. In some embodiments, the step 820 comprises a machine learning process. In some embodiments, the step 820 comprises a step of identifying recurring HyperText Markup Language (HTML learning) elements in the plurality of web pages. In some embodiments, each of the recurring HTML learning elements contains a Uniform Resource Locator (URL) link or an image. In some embodiments, the recurring HTML learning elements comprise HTML learning child parents that share a common HTML learning parent element.

The method 800 includes a step 830 to electronically scan the inventory pages to extract a price for each of the products or services. In some embodiments, the step 830 comprises scanning for a number and a currency symbol in the recurring HTML learning elements. In some embodiments, the step 830 comprises scanning for a space character or a "-" symbol. In some embodiments, the electronic scan in step 830 is performed at least in part using a Regex command. In some embodiments, the step 830 comprises scanning comprises extracting an original price and a new price for each of the products or services in a subset of the products or services. In some embodiments, the extracting of the original price and the new price comprises analyzing a Cascading Style Sheets (CSS) style of each of the web pages. In some embodiments, the analyzing of the CSS style comprises determining whether the CSS style contains text-decoration, a font color other than a main font color, or a font weight exceeding a predefined threshold. The CSS style analysis may include utilizing a machine learning model in some embodiments as described above, for example by providing training data that indicates CSS style changes with price discounts (or possibly price increases), and/or accessing a database that stores the correspondence between CSS style and price changes.

The method 800 includes a decision step 840 to determine that, based on the CSS style analysis, whether there has been a price change for one or more of the products. If the answer from the decision step 840 is no, then the method 800 proceeds to a step 850 to generate an output that includes a listing of the products or services and prices associated with the products or services, respectively. In some embodiments, the step 850 comprises removing at least a portion of a prefix or at least a portion of a suffix that is common to at least a subset of the products or services.

The method 800 includes a step 840 to generate an output that includes a listing of the products or services and prices associated with the products or services, respectively. the answer from the decision step 840 is yes, the method 800 proceeds to a step 860 to revise or update the output based on the new price. As discussed above, the new price is most likely a price discount, but it could also be a price increase as well. In some embodiments, the revised output may list the old price and the new price side by side. In other embodiments, the revised output may replace the old price with the new price.

It is understood that additional method steps may be performed before, during, or after the steps 810-860 discussed above. For example, the method 800 may include a step to display the generated output via a screen of a device. As another example, the method 800 may include a step to export the output to a data processing tool for further analysis. For reasons of simplicity, other additional steps are not discussed in detail herein.

Based on the above discussions, it can be seen that the present disclosure offers several significant advantages over conventional methods and systems. It is understood, however, that not all advantages are necessarily discussed in detail herein, different embodiments may offer different advantages, and that no particular advantage is required for all embodiments. One advantage is improved functionality of a computer. For example, conventional computer systems at best may be able to extract product information only from a known merchant web page or platform, as the conventional computer systems are typically custom designed/built for the known merchant web page or platform. As such, conventional computer systems lack the versatility and adaptability needed to extract product information from a plurality of merchant web pages or platforms. In contrast, the computer system of the present disclosure can function in a merchant-agnostic manner: it can identify inventory web pages and extract product information (e.g., price) from the identified inventory web pages without requiring any prior knowledge of the configuration or setup of the merchant web pages or platforms. As another example of the improved computer functionality, the computer system herein utilizes machine learning and/or the detection of recurring HTML learning structures to identify which of the merchant web pages are inventory pages. This allows the computer system herein to achieve a speedy and yet accurate result in the inventory page identification, which is something that would not have been possible using conventional computers.

The inventive ideas of the present disclosure are also integrated into a practical application, for example into the automatic product information extraction module 200 discussed above. Such a practical application can generate an output that is easily read and understood by a human user, and it can also be expediently exported to a data processing tool such as a computer spreadsheet. With the neatly formatted output data available regarding product information from merchants across different regions, types, or industries, the present disclosure allows one to gain valuable insight with respect to product trends or competitive strategy.

It should be appreciated that like reference numerals are used to identify like elements illustrated in one or more of the figures, wherein these labeled figures are for purposes of illustrating embodiments of the present disclosure and not for purposes of limiting the same.

One aspect of the present disclosure involves a method that includes the following steps: accessing, via one or more hardware processors, a plurality of web pages of a plurality of merchants; identifying, via the one or more hardware processors and based on the accessing, a subset of the plurality of web pages as inventory pages that contain information about products or services offered for sale; electronically scanning, via the one or more hardware processors, the inventory pages to extract a price for each of the products or services; and generating, via the one or more hardware processors, an output that includes a listing of the products or services and prices associated with the products or services, respectively.

Another aspect of the present disclosure involves a system that includes a non-transitory memory and one or more hardware processors coupled to the non-transitory memory and configured to read instructions from the non-transitory memory to cause the system to perform operations comprising: accessing a plurality of web pages of a plurality of merchants, wherein at least some of the plurality of web pages are inventory pages that contain pricing information; determining, using machine learning or detection of recurring HyperText Markup Language (HTML) structures, which of the plurality of web pages are the inventory pages; extracting, based on an electronic pattern search of the inventory pages, at least the pricing information from the inventory pages; and generating an output based on the extracted pricing information.

Yet another aspect of the present disclosure involves a non-transitory machine-readable medium having stored thereon machine-readable instructions executable to cause a machine to perform operations comprising: accessing a plurality of web pages of a plurality of merchants; labeling, at least in part using a machine learning process, a first subset of the plurality of web pages as preliminary inventory pages; detecting a second subset of the preliminary inventory pages that each contains recurring HyperText Markup Language (HTML) elements; confirming the second subset of the preliminary inventory pages as true inventory pages; electronically scanning the recurring HTML elements in the true inventory pages; extracting, based on the electronically scanning, product descriptions and pricing data for a plurality of products on each of the true inventory pages; and generating an output that contains a listing of the plurality of products, the listing including the product descriptions and the pricing data.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
accessing, via one or more hardware processors, a plurality of web pages of a plurality of merchants;
identifying, via the one or more hardware processors and based on the accessing, a subset of the plurality of web pages as inventory pages that contain information about products or services offered for sale, wherein the identifying is performed using a machine learning process or using a detection of recurring HyperText Markup Language (HTML) elements in the plurality of web pages;
electronically scanning, via the one or more hardware processors, the inventory pages to extract first prices for each of the products or services, respectively;
analyzing, after the first prices have been extracted, a Cascading Style Sheets (CSS) style of each of the inventory pages;
accessing a plurality of predefined CSS styles that correspond to price changes;
determining, at least in part based on comparing the analyzed CSS styles with the plurality of predefined CSS styles, that the first prices of the products or services of at least a subset of the inventory pages changed to second prices, respectively; and generating, via the one or more hardware processors, an output that includes a listing of the products or services of at least the subset of the inventory pages and the first prices and the second prices associated with the products or services, respectively.

2. The method of claim 1, wherein the machine learning process comprises a first machine learning process, and wherein the analyzing or the accessing the plurality of predefined CSS styles is performed using a second machine learning process.

3. The method of claim 1, wherein the identifying further comprises:
identifying, using the machine learning process, a first subset of web pages from the plurality of web pages as potential inventory pages; and
performing the detection of recurring HTML elements on the potential inventory pages to confirm whether each of the potential inventory pages is one of the inventory pages.

4. The method of claim 1, wherein each of the recurring HTML elements contains a Uniform Resource Locator (URL) link or an image.

5. The method of claim 1, wherein the recurring HTML elements comprise child HTML parents that share a common parent HTML element.

6. The method of claim 1, wherein the electronically scanning comprise scanning for a number and a currency symbol in the recurring HTML elements.

7. The method of claim 6, wherein the scanning further comprises scanning for a space character or a "-" symbol.

8. The method of claim 1, wherein the electronically scanning is performed at least in part using a Regex command.

9. The method of claim 1, wherein the accessing comprises accessing an electronic database that stores the plurality of predefined CSS styles.

10. The method of claim 1, wherein the generating the output further comprises exporting the listing of the products or services to an electronic spreadsheet.

11. The method of claim 1, wherein the analyzing the CSS style comprises determining whether the CSS style contains a text-decoration, a font color other than a main font color, or a font weight exceeding a predefined threshold.

12. The method of claim 1, wherein the generating the output comprises removing at least a portion of a prefix or at least a portion of a suffix that is common to at least a subset of the products or services.

13. A system, comprising:
a non-transitory memory; and
one or more hardware processors coupled to the non-transitory memory and configured to read instructions from the non-transitory memory to cause the system to perform operations comprising:
accessing a plurality of web pages of a plurality of merchants, wherein at least some of the plurality of web pages are inventory pages that contain pricing information;
determining, using machine learning or detection of recurring HyperText Markup Language (HTML) structures, which of the plurality of web pages are the inventory pages;
extracting, based on an electronic pattern search of the inventory pages, at least the pricing information from the inventory pages;
analyzing, after the extracting, a Cascading Style Sheets (CSS) style of each of the inventory pages;
accessing a plurality of predefined CSS styles that correspond to price changes;
determining, at least in part based on comparing the analyzed CSS style with the plurality of predefined CSS styles, that the pricing information of at least a subset of the inventory pages has changed; and
generating an output based on the extracted pricing information.

14. The system of claim 13, wherein the determining comprises:
labeling, based on the machine learning, a first subset of the plurality of web pages as preliminary inventory pages; and
confirming, based on the detection of recurring HTML structures, whether each of the preliminary inventory pages is a true inventory page.

15. The system of claim 13, wherein the detection of recurring HTML structures comprises a detection of recurring child HTML elements that share a common parent HTML element.

16. The system of claim 13, wherein the electronic pattern search comprises a search for a combination of at least a number and a currency symbol in the recurring HTML structures.

17. The system of claim 13, wherein the accessing comprises accessing an electronic database that stores the plurality of predefined CSS styles.

18. The system of claim 13, wherein the generating the output comprises:
generating a list of product descriptions corresponding to the extracted pricing information;
identifying common prefixes or common suffixes in the generated product descriptions; and
removing at least a portion of the common prefixes or at least a portion of the common suffixes from the product descriptions.

19. A non-transitory machine-readable medium having stored thereon machine-readable instructions executable to cause a machine to perform operations comprising:
accessing a plurality of web pages of a plurality of merchants;
labeling, at least in part using a machine learning process, a first subset of the plurality of web pages as preliminary inventory pages;
detecting a second subset of the preliminary inventory pages that each contains recurring HyperText Markup Language (HTML) elements;
confirming the second subset of the preliminary inventory pages as true inventory pages;
electronically scanning the recurring HTML elements in the true inventory pages;
extracting, based on the electronically scanning, product descriptions and pricing data for a plurality of products on each of the true inventory pages;
analyzing, after the extracting, a Cascading Style Sheets (CSS) style of each of the true inventory pages;
accessing a plurality of predefined CSS styles that correspond to price changes;
determining, at least in part based on comparing the analyzed CSS styles with the plurality of predefined CSS styles, that the pricing data of at least a subset of the true inventory pages has been updated; and
generating an output that contains a listing of the plurality of products, the listing including the product descriptions and the updated pricing data.

20. The non-transitory machine-readable medium of claim 19, wherein the accessing comprises accessing an electronic database that stores the plurality of predefined CSS styles.

\* \* \* \* \*